(12) United States Patent
Morales Bolaños et al.

(10) Patent No.: US 11,148,803 B2
(45) Date of Patent: Oct. 19, 2021

(54) TAKE OFF AND LANDING SYSTEM FOR DRONE FOR USE WITH AN AUTONOMOUS VEHICLE

(71) Applicant: Ford Global Technologies, LLC, Dearborn, MI (US)

(72) Inventors: Hedy H. Morales Bolaños, Naucalpan (MX); David Franco Lopez Rubio, Lerma (MX); Oswaldo Perez Barrera, Texcoco (MX); Rodrigo Frieventh Cienfuegos, Toluca (MX)

(73) Assignee: Ford Global Technologies, LLC, Dearborn, MI (US)

( * ) Notice: Subject to any disclaimer, the term of this patent is extended or adjusted under 35 U.S.C. 154(b) by 185 days.

(21) Appl. No.: 16/109,428

(22) Filed: Aug. 22, 2018

(65) Prior Publication Data
US 2020/0062388 A1 Feb. 27, 2020

(51) Int. Cl.
*B64C 39/02* (2006.01)
*G05D 1/00* (2006.01)
*G05D 1/02* (2020.01)

(52) U.S. Cl.
CPC ......... *B64C 39/024* (2013.01); *G05D 1/0088* (2013.01); *G05D 1/0094* (2013.01); *G05D 1/0223* (2013.01); *B64C 2201/021* (2013.01); *B64C 2201/08* (2013.01); *B64C 2201/104* (2013.01); *B64C 2201/182* (2013.01); *B64C 2201/208* (2013.01); *G05D 2201/0213* (2013.01)

(58) Field of Classification Search
CPC ............ B64C 39/024; B64C 2201/021; B64C 2201/08; B64C 2201/104; B64C 2201/182; B64C 2201/208; G05D 1/0088; G05D 1/0094; G05D 1/0223; G05D 2201/0213
See application file for complete search history.

(56) References Cited

U.S. PATENT DOCUMENTS

| | | | |
|---|---|---|---|
| 9,056,676 B1 | 6/2015 | Wang | |
| 9,211,959 B2 | 12/2015 | Teller et al. | |
| 9,505,493 B2 * | 11/2016 | Borko | B64C 39/024 |
| 2003/0017032 A1 * | 1/2003 | Olesen | G05B 19/042 |
| | | | 414/226.01 |
| 2006/0249623 A1 * | 11/2006 | Steele | B64F 1/029 |
| | | | 244/116 |
| 2009/0314883 A1 | 12/2009 | Arlton et al. | |

(Continued)

FOREIGN PATENT DOCUMENTS

CN 106143941 A 11/2016

*Primary Examiner* — Yazan A Soofi
*Assistant Examiner* — Naeem Taslim Alam
(74) *Attorney, Agent, or Firm* — Brandon Hicks; Eversheds Sutherland (US) LLP (57) ABSTRACT

An autonomous vehicle includes a retractable harness mounted within the vehicle and extendible through an opening in the vehicle body, such as a sun roof. The harness may include a retainer, such as an electromagnet, for engaging a docking structure on an aerial drone. On take-off, the vehicle may reach a desirable take-off speed of the aerial drone, activate the aerial drone, and release the retainer. On landing, the aerial drone and vehicle may synchronize their speeds and locations. The retractable harness may extend and align itself with the aerial drone, which descends and docks with the retractable harness.

20 Claims, 5 Drawing Sheets

(56) References Cited

U.S. PATENT DOCUMENTS

| | | |
|---|---|---|
| 2012/0152654 A1 | 6/2012 | Marcus |
| 2015/0102154 A1 | 4/2015 | Duncan et al. |
| 2016/0144982 A1* | 5/2016 | Sugumaran ............. B64F 1/005 244/103 R |
| 2016/0200438 A1* | 7/2016 | Bokeno ................... B60L 53/53 244/2 |
| 2017/0132562 A1* | 5/2017 | High ................... G06Q 10/0833 |
| 2017/0144762 A1* | 5/2017 | Retig .................... B64C 39/024 |
| 2018/0009549 A1* | 1/2018 | Sullivan ................ B64C 39/024 |
| 2018/0134412 A1* | 5/2018 | Poh ........................ B64F 1/222 |
| 2018/0162528 A1* | 6/2018 | McGrew ................. B64C 27/08 |
| 2019/0138028 A1* | 5/2019 | Coleman ......... B60W 30/18009 |
| 2019/0276147 A1* | 9/2019 | Lee ........................ B60L 53/36 |

\* cited by examiner

TAKE OFF AND LANDING SYSTEM FOR DRONE FOR USE WITH AN AUTONOMOUS VEHICLE

BACKGROUND

Field of the Invention

This invention relates to operating drones and autonomous vehicles.

Background of the Invention

Drones have great promise to efficiently deliver goods to customers and/or provide emergency assistance. However, drones may be hampered by limited range and short flight times.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Unmanned aerial vehicles (UAVs), or fixed wing drones, are growing in usage, and may be integrated with vehicles, including autonomous vehicles, increasingly in the future. Facilitating takeoff and landing of UAVs may become more important as UAVs become integrated with more types of vehicles.

For example, it may be beneficial to have a mechanism for facilitating deployment and landing of a UAV integrated with a vehicle. If the vehicle is moving, the mechanism may allow for deployment and landing at given vehicle speeds.

Example embodiments of the present disclosure relate to systems, methods, and devices for an enhanced takeoff and landing system for UAVs integrated with vehicles.

In one or more embodiments, a mechanism which facilitates a UAV's entry to and exit from a vehicle may include harnesses which automatically open and close. The mechanism may include a combination of rotating arms used to move the UAV. The arms may be spider arms or other types of moveable arms used to adjust the positioning of the UAV.

In one or more embodiments, an application may synchronize a vehicle (e.g., through an in-vehicle computer) with a UAV. The application may be used to determine requirements of UAV takeoff and deployment. The application may register a user and the UAV, including the type of UAV. The application may have access to a database of UAVs and their associated battery lives, takeoff speeds, landing speeds, crash rates, maximum and minimum speeds, and the like. The application may be used to communicate with a UAV to determine UAV battery life, device location, and other device parameters. The application may be used to determine when a UAV is at optimal speeds for takeoff and landing (e.g., with respect to an expected flight time). The application may also facilitate communication with the mechanism for moving the UAV. For example, the application may cause signals to the mechanism to request opening and closing the automatic harnesses.

In one or more embodiments, a UAV may deploy through a sun-roof or other opening of a vehicle. The opening may automatically open and close based on commands, for example, and may open and close based on a vehicle's speed to allow for UAV takeoff and landing.

In one or more embodiments, the application may activate a UAV use mode to cause the mechanism to lower into the vehicle so that a user may position and/or interact with a drone in the mechanism. When a takeoff mode is activated using the application, the application can signal to the sunroof or opening to open, and can signal to the mechanism to raise the UAV for deployment. When the vehicle is moving at a takeoff speed suitable for the UAV, the application may signal to the harness of the mechanism to open to release the UAV, and to signal to the mechanism to return to a position within the vehicle.

In one or more embodiments, when a batter life dissipates, the application may cause a signal to be sent to the UAV to return and land in the vehicle. The application may send a signal to the sun roof or opening to open, and may send a signal to the mechanism to rise and prepare for landing the UAV. The application may determine that the UAV is positioned in the mechanism, the application can send signals to the mechanism to close the harness to lock the UAV, and to reenter the vehicle.

The embodiments disclosed herein may allow UAV integration with vehicles to facilitate takeoff and landing of fixed wing drones.

Figure 1:
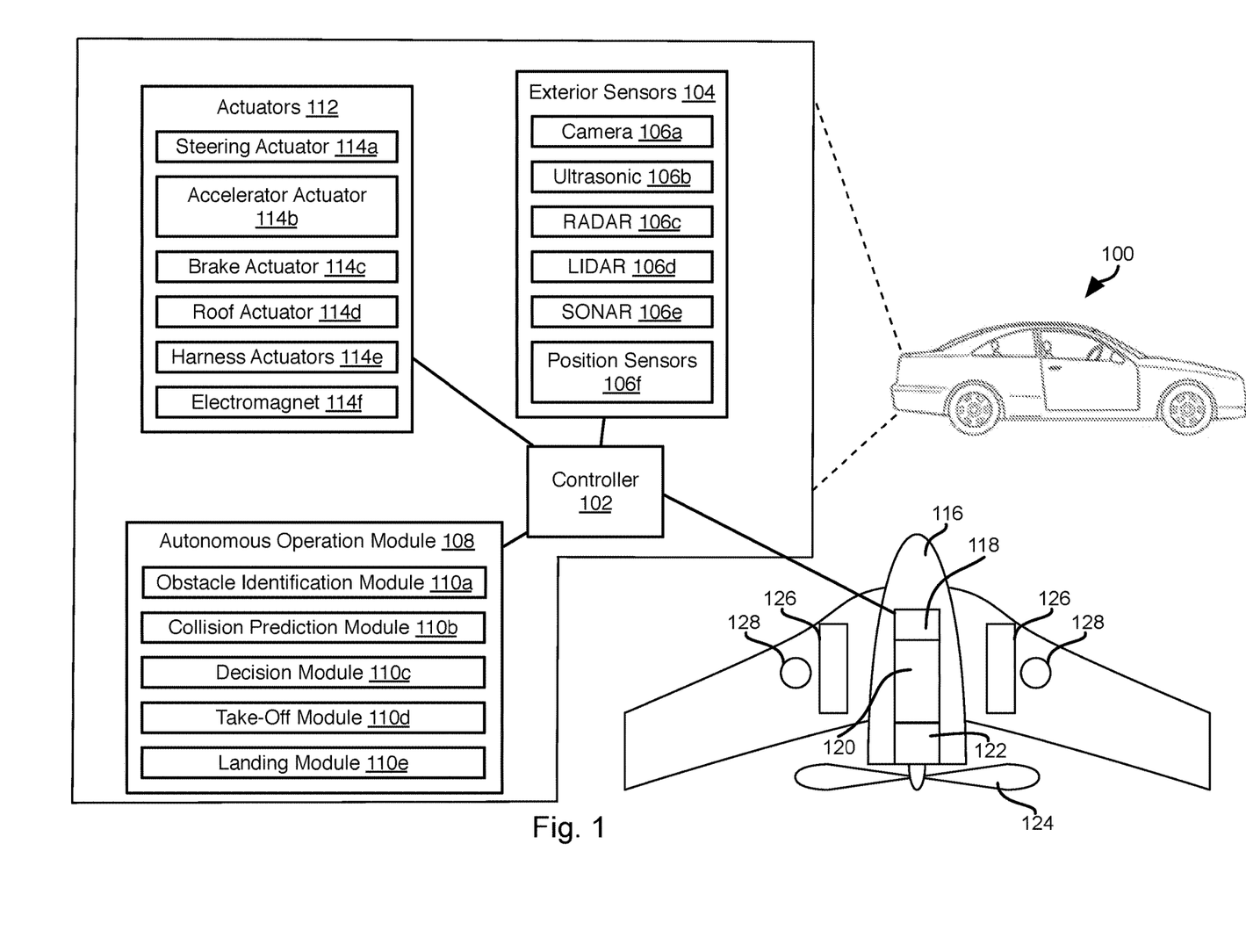
FIG. 1 is a schematic block diagram of components implementing an autonomous vehicle and docking drone, in accordance with one or more example embodiments of the present disclosure. in accordance with an embodiment of the present invention.

Referring to FIG. 1, a vehicle 100 including some or all of the illustrated components may be any vehicle known in the art. The vehicle 100 may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, a controller 102 of the vehicle 100 may perform autonomous navigation and facilitate collision avoidance. The controller 102 may receive one or more outputs from one or more exterior sensors 104. For example, one or more cameras 106a may be mounted to the vehicle 100 and output image streams received to the controller 102. The sensors 104 may provide data related to UAV and vehicle positioning, speed, and the like.

The exterior sensors 104 may include sensors such as an ultrasonic sensor 106b, a RADAR (Radio Detection and Ranging) sensor 106c, a LIDAR (Light Detection and Ranging) sensor 106d, a SONAR (Sound Navigation and Ranging) sensor 106e, and the like.

As discussed in detail herein, one or more position sensors 106f may sense a position of an aerial drone (e.g., aerial drone 116) above the vehicle 100. For example, position sensors 106f may be optical sensors, i.e. cameras, that can sense an optical pattern, e.g. unique target on the underside of an aerial drone.

The controller 102 may execute an autonomous operation module 108 that receives the outputs of the exterior sensors 104. The autonomous operation module 108 may include an obstacle identification module 110a, a collision prediction module 110b, and a decision module 110c. The obstacle identification module 110a analyzes the outputs of the exterior sensors and identifies potential obstacles, including people, animals, vehicles, buildings, curbs, and other objects and structures. In particular, the obstacle identification module 110a may identify vehicle images in the sensor outputs.

The collision prediction module 110b predicts which obstacle images are likely to collide with the vehicle 100 based on its current trajectory or current intended path. The collision prediction module 110b may evaluate the likelihood of collision with objects identified by the obstacle identification module 110a. The decision module 110c may make a decision to stop, accelerate, turn, etc. in order to avoid obstacles. The manner in which the collision prediction module 110b predicts potential collisions and the manner in which the decision module 110c takes action to avoid potential collisions may be according to any method or system known in the art of autonomous vehicles.

In embodiments disclosed herein, the autonomous operation module 108 may perform autonomous navigation to a specified location, autonomous parking, and other automated driving activities known in the art.

The decision module 110c may control the trajectory of the vehicle by actuating one or more actuators 112 controlling the direction and speed of the vehicle 100. For example, the actuators 112 may include a steering actuator 114a, an accelerator actuator 114b, and a brake actuator 114c. The configuration of the actuators 114a-114c may be according to any implementation of such actuators known in the art of autonomous vehicles.

The actuators 112 may further include a roof actuator 114d for opening a covering for an opening in the roof of the vehicle, e.g., a sun roof. The actuators may further include harness actuators 114e that actuate a harness for docking and deploying an aerial drone. The actuators 112 may further include an actuated locking mechanism for securing the aerial drone to the harness. For example, the locking mechanism may be an electromagnet 114f that may be selectively activated to hold the aerial drone. Other electronically controlled locking mechanisms known in the art may also be used.

The autonomous operation module 108 may include modules that facilitate operation of the vehicle 100 in coordination with an aerial drone. For example, a take-off module 110d may communicate with an aerial drone in order to coordinate taking off of the aerial drone from the vehicle 100 as described in detail below. Likewise, a landing module 110e may synchronize speed and location with the aerial drone to facilitate docking of the aerial drone with the vehicle 100. The manner in which taking off and landing are facilitated by the controller 102 is described in detail below.

An aerial drone 116 may be an aerial drone according to any type known in the art. In the illustrated embodiment, the drone 116 is a fixed wing drone. However, rotary wing drones, e.g. a quadcopter drone, may also be used in accordance to the methods disclosed herein. Fixed wing drones are able to fly more efficiently and are therefore it is a particular advantage of the embodiments disclosed herein that they are able to interface with fixed wing drones.

The aerial drone 116 may include conventional features of an aerial drone known in the art, such as a controller 118 capable of wireless communication with the controller 102, a battery 120 or other power supply, and one or more motors 122 coupled to one or more propellers 124. The aerial drone 116 may include other conventional structures such as control surfaces (rudder, elevator, ailerons, etc.) and corresponding actuators. The controller 118 may be operably coupled to the power supply, one or more motors 122, and control surface actuators in order to control the flight path of the aerial drone 116 according to any approach known in the art.

The aerial drone may include other structures for performing useful aerial tasks, such as cameras for performing surveillance, instruments for measuring, mounting structures for carrying cargo, or other structures for performing any useful function of drones known in the art.

Figure 2A:
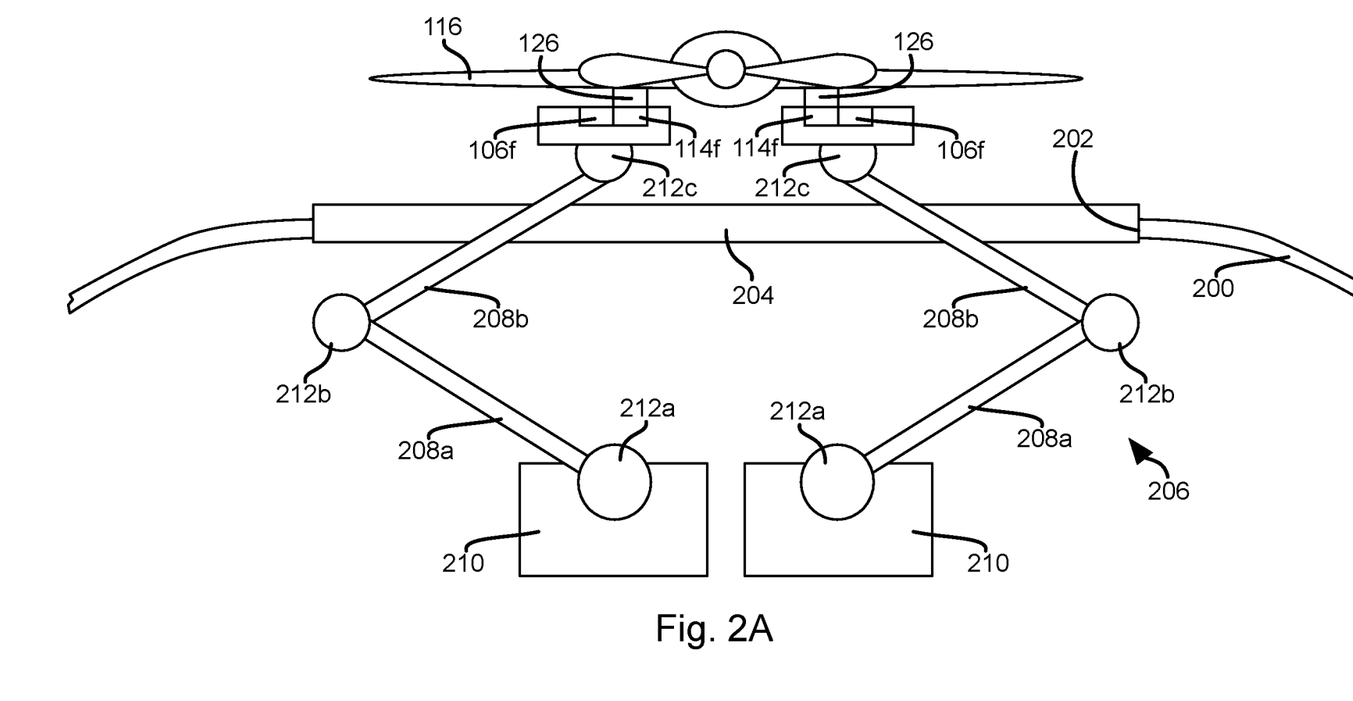
FIG. 2A illustrates an example docking harness in an extended position and docking with an aerial drone, in accordance with one or more example embodiments of the present disclosure. in accordance with an embodiment of the present invention.
Figure 2B:
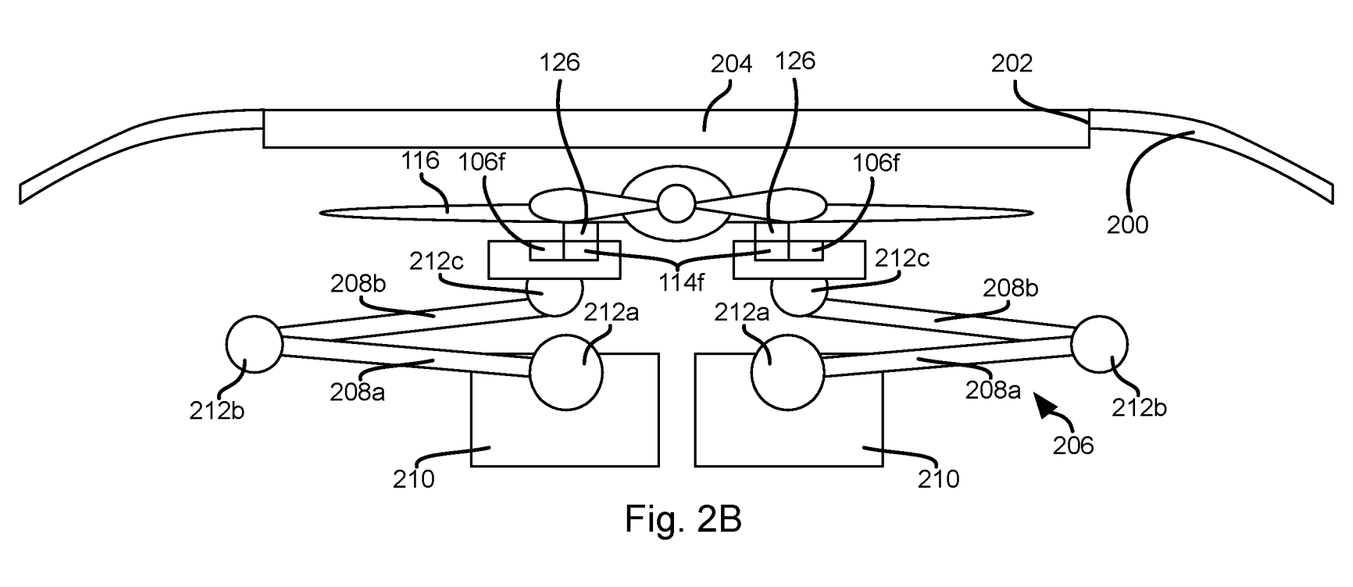
FIG. 2B illustrates an example docking harness and aerial drone in a retracted position, in accordance with one or more example embodiments of the present disclosure, in accordance with an embodiment of the present invention.

The aerial drone 116 may further include docking structures 126 on an underside of the aerial drone 116 for fastening to a harness mounted to the vehicle (see FIGS. 2A and 2B). For example, where a retainer on the harness is an electro magnet, the docking structures 126 may include ferromagnetic (e.g., steel) material or magnets of any know variety, such as rare earth magnets. In the illustrated embodiment there are two docking structures 126. In other embodiments there may be one, three, or any other number of docking structures 126.

As noted above, position sensor 106f may detect a position of the aerial drone 116. Accordingly, one or more alignment guides 128 may be accessible on an underside of the aerial drone. The alignment guides 128 may be targets visible in a wavelength range perceptible by a camera embodying the position sensor 106f. The alignment guides 128 may be powered lights that emit light in a wavelength detectable by the position sensor 106f.

Referring to FIG. 2A, a roof 200 of the body of the vehicle 100 may include an opening 202, such as for a sunroof. As known in the art, a retractable cover 204 may cover the opening 202 and be opened by the roof actuator 114d or manually. The structure and implementation of the retractable cover 204 and the roof actuator 114d therefore may be according to any approach known in the art for implementing a cover for a sunroof, such as are currently used in many passenger vehicles or other types of vehicles.

Mounted within the body of the vehicle 100 is a harness 206 for holding the drone 116 and for deploying and docking the drone 116 according to the methods disclosed herein.

The harness 206 is configured to raise and lower a retainer selectively engaging the docking structure 126 of the drone 116, such as the electromagnet 114f. As shown, the harness 206 may include a retainer for each docking structure 126, such as two electromagnets 114f in the illustrated embodiment. Each retainer may be independently actuated or may be fixed relative to one another.

In the illustrated embodiment, each electromagnet 114f is mounted to a linkage including one or more arms, such as two arms 208a, 208b. A first end of arm 208a may be mounted to a base 210 and a second end may be pivotally coupled to a first end of the arm 208b. A second end of the arm 208b may be mounted to the electromagnet 114f. The base 210 may mount to the roof 200, floor, seats, or other structure within the interior of the vehicle in order to facilitate retrieval and deployment of the drone 116 through the opening 202.

In the illustrated embodiment, the harness actuator 114e includes an actuator 212a coupling the first arm 208a to the base 210, an actuator 212b coupling the first arm 208a to the second arm 208b, and an actuator 212c coupling the second arm 208b to the electromagnet 114f. In some embodiments, the first arm 208a mounts to the base 210 by means of a ball joint such that the actuator 212a can move the arm 208a 360 degrees in a horizontal plane as well as some range of motion in a vertical plane perpendicular to the horizontal plane. Such a range of motion may also be achieved by a combination of hinges having mutually perpendicular axes of rotation. The joint between the first arm 208a, 208b may be a hinge permitting motion in a two-dimensional plane or may be a ball joint or other joint or set of joints allowing rotation about multiple axes. The joint between the second arm 208b and the electromagnet 114f may be a hinge permitting motion in a two-dimensional plane or may be a ball joint or other joint or set of joints allowing rotation about multiple axes over a range of 360 degrees.

As is apparent in FIG. 2A each linkage (set of arms 208a, 208b and corresponding actuators) is shown as being independently actuated and capable of independent movement. In some embodiments, a control algorithm may move the electromagnets 114f of a linkage substantially in unison subject to vibration, delays, and other disturbances. In other embodiments, the electromagnets 114f may be fixed to one another, such as being fastened to one another by a structural member.

In the illustrated embodiment, the position sensor 106f includes two position sensors mounted adjacent to the electromagnet 114f, e.g., mounted to a common structure actuated by the actuator 212c relative to the second arm 208b. Accordingly, the controller 102 may actuate a linkage to align the position sensors 106f thereof with one of the alignment guides 128. Alternatively, the position sensor 106f may be mounted elsewhere, such as on the roof 200 or elsewhere on the body of the vehicle 100.

The controller 102 may be programmed to control the actuators 212a-212c in order to position the electromagnets 114f. The manner in which the controller 102 performs this function and structures providing feedback regarding the current state of the linkages may be implemented according to any approach known in the art. In particular, this may include any approach for implementing a robotic arm and for controlling the state of the linkages in a robotic arm such as known in the art.

FIG. 2A illustrates the harness 206 in an extended position in which the electromagnets 114f and aerial drone 116 are positioned outside of the vehicle body. This position may be used during take-off and landing of the aerial drone 116.

FIG. 2B illustrates the harness 206 in a retracted position in which the electromagnets 114f and aerial drone 116 are positioned within the vehicle body such that the retractable cover 204 may close the opening 202. The harness 206 is likewise placed in the retracted position after the aerial drone 116 takes off while awaiting landing.

The vehicle 100 may further include structures for charging the aerial drone 116 while within the vehicle. This may be accomplished by one or more electrical connectors mounted adjacent one or both of the electromagnet 114f and engaging a corresponding electrical connector on the aerial drone 116 when the docking structures 126 are engaged with the electromagnets 114f.

Figure 3A:
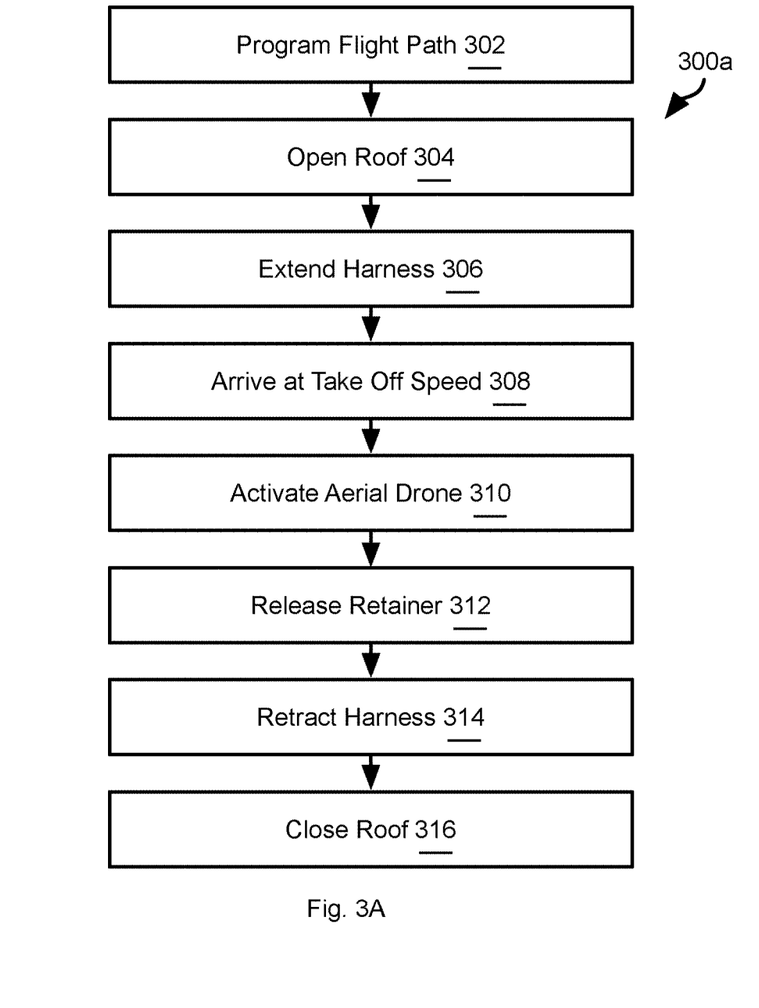
FIG. 3A depicts a flow diagram of an illustrative process for launching an aerial drone from a docking harness, in accordance with one or more example embodiments of the present disclosure, in accordance with an embodiment of the present invention.

FIG. 3A illustrates a method 300a for implementing take-off of the aerial drone 116 from the vehicle 100. The method 300a may be preceded by a synchronization step. For example, the drone 116 may provide one or more operating parameters to the controller 102, such as the type of the aerial done 116 in the form of a serial number, model number, one or more descriptors, or the like. The aerial drone 116 may further transmit one or more state parameters, such as its current state of charge or outputs of one or more internal sensors.

The controller 102 may have access to a database listing one or more operating parameters for various types of drones such as battery life, take off speed, landing speed, crash rate, maximum and minimum speed. Alternatively, the aerial drone 116 may store these values and transmit them during the synchronization step. The aerial drone 116 may further synchronize its location with the controller 102. The synchronization step may further include establishing a wireless connection between the controller 102 and the aerial drone 116, such as an encrypted connection to avoid disruptions by unauthorized actors.

Prior to take-off, the method 300 may include programming 302 the aerial drone 116 with a flight path. The aerial drone 116 may have logic enabling it to operate substantially autonomously, accordingly step 302 may include providing a destination, such as in the form of a street address or GPS coordinate. Other tasks may also be programmed such as to maintain a specified following height and distance relative to the vehicle 100 or to fly over a particular region. This step may be performed by the controller 102 based on pre-programmed functions or may be performed by a human operator having a wireless connection to the controller 102 or directly to the aerial drone 116.

The method 300 may then include opening 304 the roof (e.g., retracting the cover 204) and extending 306 the harness 206. The controller 102 may then operate the vehicle 100 such that it arrives 308 at a speed that is suitable for take-off of the aerial drone 116. The aerial drone 116 may have a range of suitable take-off speeds, accordingly step 308 may include selecting a speed within this range that is compatible with the current driving environment of the vehicle, e.g. current speed limit, current traffic conditions of the vehicle 100, and handling limits of the vehicle 100.

The method 300 may then include activating 310 the aerial drone 116 and releasing 312 a retainer holding the aerial drone 116 to the harness 206. For example, the controller 102 may instruct the aerial drone 116 to activate, e.g., start rotating the one or more propellers 124. The controller 102 may then receive a signal from the drone 116 indicating that the propeller 124 is up to speed suitable for take-off at the vehicle's 100 current speed. In response, the controller 102 may release the retainer, which may include deactivating the electromagnets 114f or otherwise redirecting the magnetic field of the electromagnets 114f to release the docking structures 126.

The controller 102 may then activate the actuators 212a-212c effective to retract 314 the harness 206 and invoke (e.g., cause) closing 316 of the roof by moving the cover 204 over the opening 202.

Figure 3B:
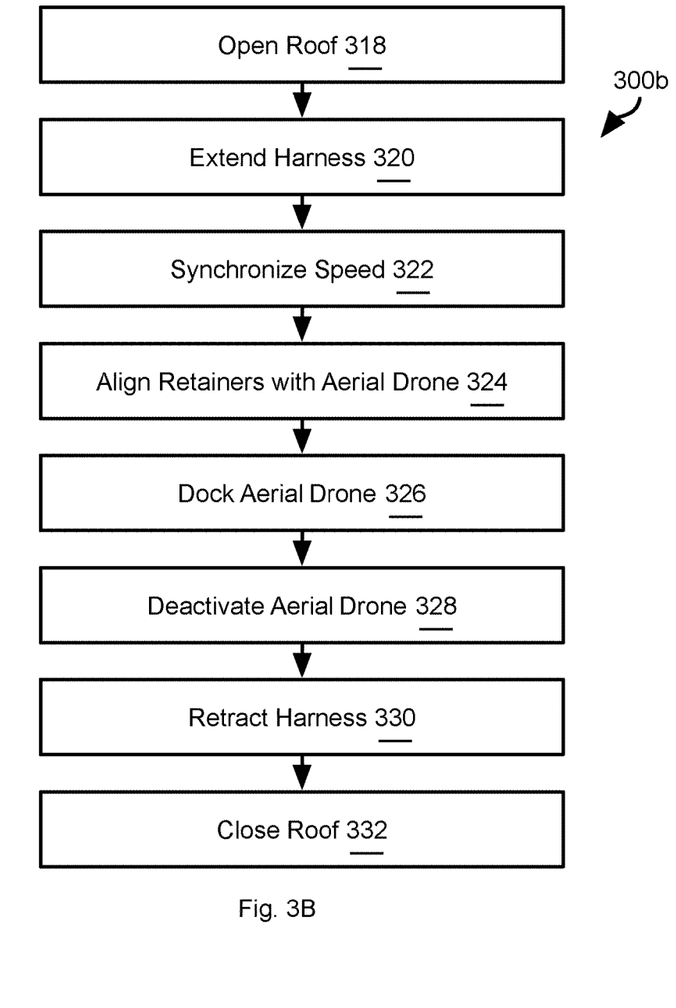
FIG. 3B is a flow diagram of an illustrative process for docking an aerial drone using a docking harness, in accordance with an embodiment of the present invention.

FIG. 3B illustrates a method 300b for docking a flying aerial drone 116 onto the vehicle 100. The method 300b may be invoked (e.g., caused or facilitated) by the controller 102 receiving a signal from the aerial drone 116 indicating an intent to dock (e.g., in response to detecting low battery power remaining) or by logic in the controller 102 that instructs the aerial drone 116 to dock and also commences execution of the method 300b, such as expiration of a timer corresponding to a permitted flight time for the aerial drone 116.

The method 300b may include opening 318 the roof and extending 320 the harness 206. The method 300b may further include synchronizing 322, by the controller 102, the speed of the vehicle 100 with the speed of the aerial drone 116. Step 324 may include coordination by both the aerial drone 116 and the controller 102 by aligning retainers (e.g., electromagnets 114) with the aerial drone 116. For example, the controller 102 vehicle 100 may achieve a safe landing speed for the aerial drone that is permitted by current road conditions (obstacles, speed limit, other traffic, handling limits of the vehicle 100, etc.). This speed may be selected to be close to the current speed of the aerial drone within limits imposed by current road conditions. The controller 102 and aerial drone 116 may transmit their current speeds to one another and adjust their speeds to be closer to one another. Step 322 further includes the aerial drone 116 aligning itself with the current trajectory of the vehicle 100 and converging on its location. For example, controller 102 and aerial drone 116 may exchange their current locations and control their speeds in order to approach one another's positions in the horizontal plane. In the case of the aerial drone 116, it may adjust its position in the horizontal plane perpendicular to the direction of movement of the vehicle 100 to align with the vehicle 100. Step 322 may also execute an algorithm evaluating the speed and distance required by the aerial drone 116 to land. The controller 102 may therefore arrive at a position at a time and having a speed indicated by the algorithm in order for the aerial drone 116 to dock onto the vehicle 100.

Once the aerial drone 116 is positioned over the vehicle, the controller 102 may attempt to align 324 a retainer (e.g., electromagnets 114) with the docking structure of the aerial drone 116. For example, the controller 102 may sense the position of one or more alignment guides 128 with one or more positions sensors 106f and actuate the actuators 212a-212c to position the retainers at the same location in a horizontal plane as the corresponding docking structures 126. In some embodiments, engagement of one retainer may be required to dock the aerial drone 116. Accordingly, the controller 102 may attempt to align one or more retainers with a docking structure 126, but docking (step 326) may be performed as long as at least one is aligned with a corresponding docking structure 126.

The aerial drone 116 may then dock 326 by lowering over the retainers and the controller 102 invoking activation of the retainer, e.g. activating the electromagnets 114f. For example, the position sensors 106f or other proximity sensor coupled to the controller may indicate to the controller 102 that the aerial drone 116 is within a threshold distance from the electromagnets 114 and, in response, the controller 102 may activate the electromagnets 114. In other embodiments, the aerial drone 116 may transmit an instruction to the controller 102 to activate the retainers, such as in response to detecting proximity to the retainers.

The aerial drone 116 may deactivate 328, such as in response to a signal from the controller 102. This may include turning off the motor 122 and turning off other electronic components of the aerial drone 116, such as the controller 118. The aerial 116 may also commence charging its battery 120.

The controller 102 then invokes retracting 330 of the harness 206 and closing 332 of the roof.

Figure 4:
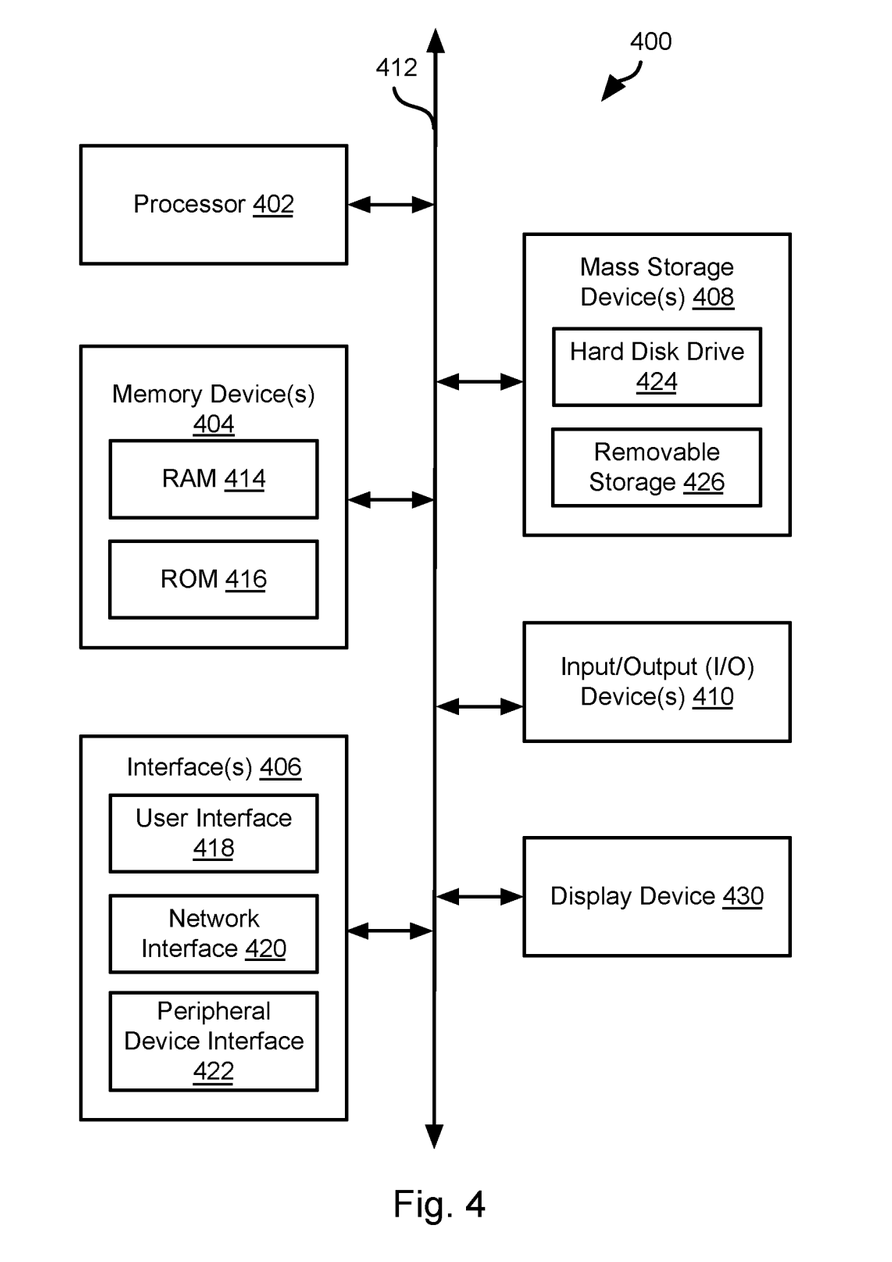
FIG. 4 is a block diagram of an example machine upon which any of one or more techniques (e.g., methods) may be performed, in accordance with one or more example embodiments of the present disclosure.

FIG. 4 is a block diagram illustrating an example computing device 400. Computing device 400 may be used to perform various procedures, such as those discussed herein.

Computing device 400 includes one or more processor(s) 402, one or more memory device(s) 404, one or more interface(s) 406, one or more mass storage device(s) 408, one or more Input/Output (I/O) device(s) 410, and a display device 430 all of which are coupled to a bus 412. Processor(s) 402 include one or more processors or controllers that execute instructions stored in memory device(s) 404 and/or mass storage device(s) 408. Processor(s) 402 may also include various types of computer-readable media, such as cache memory.

Memory device(s) 404 include various computer-readable media, such as volatile memory (e.g., random access memory (RAM) 414) and/or nonvolatile memory (e.g., read-only memory (ROM) 416). Memory device(s) 404 may also include rewritable ROM, such as Flash memory.

Mass storage device(s) 408 include various computer readable media, such as magnetic tapes, magnetic disks, optical disks, solid-state memory (e.g., Flash memory), and so forth. As shown in FIG. 4, a particular mass storage device is a hard disk drive 424. Various drives may also be included in mass storage device(s) 408 to enable reading from and/or writing to the various computer readable media. Mass storage device(s) 408 include removable media 426 and/or non-removable media.

I/O device(s) 410 include various devices that allow data and/or other information to be input to or retrieved from computing device 400. Example I/O device(s) 410 include cursor control devices, keyboards, keypads, microphones, monitors or other display devices, speakers, printers, network interface cards, modems, lenses, CCDs or other image capture devices, and the like.

Display device 430 includes any type of device capable of displaying information to one or more users of computing device 400. Examples of display device 430 include a monitor, display terminal, video projection device, and the like.

Interface(s) 406 include various interfaces that allow computing device 400 to interact with other systems, devices, or computing environments. Example interface(s) 406 include any number of different network interfaces 420, such as interfaces to local area networks (LANs), wide area networks (WANs), wireless networks, and the Internet. Other interface(s) include user interface 418 and peripheral device interface 422. The interface(s) 406 may also include one or more peripheral interfaces such as interfaces for printers, pointing devices (mice, track pad, etc.), keyboards, and the like.

Bus 412 allows processor(s) 402, memory device(s) 404, interface(s) 406, mass storage device(s) 408, I/O device(s) 410, and display device 430 to communicate with one another, as well as other devices or components coupled to bus 412. Bus 412 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 400, and are executed by processor(s) 402. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

Some embodiments may be used in various other devices, systems, and/or networks.

Example 1 may be a system comprising a vehicle having a vehicle body defining an opening; a retractable harness mounted within the vehicle and defining a retainer for docking with an unmanned aerial vehicle (UAV); and one or more actuators coupled to the retractable harness and configured to move the retractable harness between a retracted positioned within the vehicle body and an extended position positioned outwardly from the opening.

Example 2 may include the system of example 1 and/or some other example herein, further comprising the UAV, the UAV defining a docking structure configured to selectively secure to the retainer.

Example 3 may include the system of example 1 or 2 and/or some other example herein, wherein the retainer comprises an electromagnet and the docking structure comprises a ferromagnetic plate.

Example 4 may include the system of example 1 or and/or some other example herein, wherein the UAV is a fixed wing aerial drone configured to detach from the retainer when the UAV is moving.

Example 5 may include the system of example 1 and/or some other example herein, wherein the retractable harness comprises a 360-degree joint mounting the retractable harness to the vehicle body.

Example 6 may include the system of example 5 and/or some other example herein, wherein the retractable harness comprises first and second links, a first end of the first link coupled to the 360 degree joint, a second end of the first link coupled to a first end of the second link at an intermediate joint, and a second end of the second link coupled to the retainer at a retainer joint; and wherein retractable harness further comprises one or more actuators are adapted to actuate the 360 degree joint, the intermediate joint, and the retainer joint.

Example 7 may include the system of example 1 and/or some other example herein, further comprising: a first sensor adapted to sense a position of the UAV; a second sensor adapted to sense a speed of the UAV; and a controller coupled to the first sensor, the second sensor, and the one or more actuators, the controller programmed to cause to launch the UAV and to align the retainer with a docking structure on the aerial drone while the aerial drone is in flight above the retainer.

Example 8 may include the device of example 1 and/or some other example herein, further comprising a vehicle controller within the vehicle and programmed to operate the vehicle autonomously.

Example 9 may include the device of example 8 and/or some other example herein, wherein the vehicle controller is further programmed to execute an application programmed to synchronize the vehicle controller with the UAV.

Example 10 may include the device of example 9 and/or some other example herein, wherein the application is further programmed to synchronize the controller with the UAV by determining one or more of the following from the UAV: battery life, location, take off speed, landing speed, maximum speed, and minimum speed.

Example 11 may include a method comprising: sending, by a controller mounted to a vehicle having a first vehicle body defining a roof opening, a first signal to one or more actuators indicating a request to extend a retractable harness from a position within the vehicle body to a position extending a retainer through the roof opening, wherein the retractable harness is mounted within the vehicle and comprises the retainer, wherein the one or more actuators are coupled to the retractable harness; determining, by a controller mounted to the vehicle, an output of a position sensor, wherein the position sensor is positioned to sense a position of the aerial drone; and sending, by the controller, a second signal to the one or more actuators indicating a request to align the retainer with a docking structure on the aerial drone based at least in part on the output of the position sensor.

Example 12 may include the method of example 11 and/or some other example herein, further comprising sending, by the controller, a third signal to the one or more actuators indicating a request to withdraw the retainer into the vehicle body through the roof opening.

Example 13 may include the method of example 11 and/or some other example herein, wherein the controller is further programmed to operate the vehicle autonomously, the method further comprising determining, by the controller, a speed and location of the aerial drone; and synchronizing, by the controller, a speed and location of the vehicle with the speed and location of the aerial drone.

Example 14 may include the method of example 11 and/or some other example herein, further comprising sending, by the controller, a third signal indicating a request for the retainer to engage the docking structure on the aerial drone.

Example 15 may include the method of example 14 and/or some other example herein, wherein the retainer is an electromagnet and the docking structure is a ferromagnetic structure.

Example 16 may include the method of example 11 and/or some other example herein, further comprising sending, by the controller, a third signal indicating a request for the one or more actuators to extend the retractable harness from a position within the vehicle body to a position extending the retainer through the roof opening having the docking structure of the aerial drone engaging the retainer; causing, by the controller, driving of the vehicle at a take-off speed of the aerial drone; and causing, by the controller, disengagement of the retainer from the docking structure and activation of the drone.

Example 17 may include the method of example 11 and/or some other example herein, wherein the aerial drone is a fixed wing aerial drone.

Example 18 may include the method of example 11 and/or some other example herein, wherein the retractable harness comprises a 360-degree joint mounting the retractable harness to the vehicle body.

Example 19 may include the method of example 18 and/or some other example herein, wherein the retractable harness comprises first and second links, a first end of the first link coupled to the 360 degree joint, a second end of the first link coupled to a first end of the second link at an intermediate joint, and a second end of the second link coupled to the retainer at a retainer joint; and wherein the one or more actuators are configured to actuate the 360 degree joint, the intermediate joint, and the retainer joint.

Example 20 may include the method of example 11 and/or some other example herein, further comprising synchronizing the controller with the aerial drone by determining one or more of the following from the aerial drone: battery life, location, take off speed, landing speed, maximum speed, and minimum speed.

Example 21 may include an apparatus comprising means for performing the method of any of examples 11-20.

Example 22 may include one or more non-transitory computer-readable media comprising instructions to cause an electronic device, upon execution of the instructions by one or more processors of the electronic device, to perform one or more elements of a method described in or related to any of examples 11-20, or any other method or process described herein Example 23 may include an apparatus comprising logic, modules, and/or circuitry to perform one or more elements of a method described in or related to any of examples 11-20, or any other method or process described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

What is claimed is:

1. An apparatus comprising:
a vehicle having a vehicle body defining an opening;
a retractable harness mounted within the vehicle and defining a retainer for docking with an unmanned aerial vehicle (UAV), the retainer comprising a first surface of a first moveable arm and a second surface of a second moveable arm, the first surface separate from the second surface, wherein the first surface comprises a first electromagnet, wherein the second surface comprises a second electromagnet, and wherein the first electromagnet and the second electromagnet are configured to engage the UAV concurrently; and
two or more actuators, a first actuator of the two or more actuators coupled to the first moveable arm, and a second actuator of the two or more actuators coupled to the second moveable arm, the two or more actuators configured to move the retractable harness between a retracted position within the vehicle body and an extended position positioned outwardly from the opening.

2. The apparatus of claim 1, further comprising:
the UAV, the UAV defining a docking structure adapted to selectively secure to the retainer.

3. The apparatus of claim 2, wherein the UAV is a fixed wing UAV configured to detach from the retainer when the UAV is moving.

4. The apparatus of claim 1, wherein the retractable harness comprises a 360-degree joint mounting the retractable harness to the vehicle body.

5. The apparatus of claim 4, wherein the retractable harness comprises first and second links, a first end of the first link coupled to the 360-degree joint, a second end of the first link coupled to a first end of the second link at an intermediate joint, and a second end of the second link coupled to the retainer at a retainer joint; and
wherein the two or more actuators are adapted to actuate the 360-degree joint, the intermediate joint, and the retainer joint.

6. The apparatus of claim 1, further comprising:
a first sensor adapted to sense a position of the UAV;
a second sensor adapted to sense a speed of the UAV; and
a controller coupled to the first sensor, the second sensor, and the two or more actuators, the controller programmed to launch the UAV and to align the retainer with a docking structure on the UAV while the UAV is in flight above the retainer.

7. The apparatus of claim 1, further comprising a vehicle controller within the vehicle and programmed to operate the vehicle autonomously.

8. The apparatus of claim 7, wherein the vehicle controller is further programmed to execute an application programmed to synchronize the vehicle controller with the UAV.

9. The apparatus of claim 8, wherein the application is further programmed to synchronize the vehicle controller with the UAV by receiving one or more of the following items of information from the UAV: battery life, location, take off speed, landing speed, maximum speed, and minimum speed.

10. A method comprising:
sending, by a controller mounted to a vehicle having a vehicle body defining a roof opening, a first signal to two or more actuators indicating a request to extend a retractable harness from a position within the vehicle body to a position extending a retainer through the roof opening, wherein the retractable harness is mounted within the vehicle and comprises the retainer, wherein the two or more actuators are coupled to the retractable harness, the retainer associated with docking an aerial drone and comprising a first surface of a first moveable arm and a second surface of a second moveable arm, a first actuator of the two or more actuators coupled to the first moveable arm, and a second actuator of the two or more actuators coupled to the second moveable arm, the first surface separate from the second surface, wherein the first surface comprises a first electromagnet, wherein the second surface comprises a second electromagnet, and wherein the first electromagnet and the second electromagnet are configured to engage the aerial drone concurrently;

determining, by the controller, an output of a position sensor, wherein the position sensor is positioned to sense a position of the aerial drone; and sending, by the controller, a second signal to the two or more actuators indicating a request to align the retainer with a docking structure on the aerial drone based at least in part on the output of the position sensor.

11. The method of claim 10, further comprising:
sending, by the controller, a third signal to the two or more actuators indicating a request to withdraw the retainer into the vehicle body through the roof opening.

12. The method of claim 10, wherein the controller is further programmed to operate the vehicle autonomously, the method further comprising:

receiving, by the controller, a speed and location of the aerial drone; and synchronizing, by the controller, a speed and location of the vehicle with the speed and location of the aerial drone.

13. The method of claim 10, further comprising sending, by the controller, a third signal indicating a request for the retainer to engage the docking structure on the aerial drone.

14. The method of claim 10, further comprising:
sending, by the controller, a third signal indicating a request for the two or more actuators to extend the retractable harness from a position within the vehicle body to a position extending the retainer through the roof opening having the docking structure of the aerial drone engaging the retainer;

causing, by the controller, driving of the vehicle at a take-off speed of the aerial drone; and causing, by the controller, disengagement of the retainer from the docking structure and activation of the aerial drone.

15. The method of claim 10, wherein the aerial drone is a fixed wing aerial drone.

16. The method of claim 10, wherein the retractable harness comprises a 360-degree joint mounting the retractable harness to the vehicle body.

17. The method of claim 16, wherein the retractable harness comprises first and second links, a first end of the first link coupled to the 360-degree joint, a second end of the first link coupled to a first end of the second link at an intermediate joint, and a second end of the second link coupled to the retainer at a retainer joint, the method further comprising instructing the two or more actuators to actuate the 360-degree joint, the intermediate joint, and the retainer joint.

18. The method of claim 10, further comprising synchronizing the controller with the aerial drone by receiving one or more of the following items of information from the aerial drone: battery life, location, take off speed, landing speed, maximum speed, and minimum speed.

19. The apparatus of claim 1, wherein the UAV comprises a docking structure having a first portion and a second portion, wherein the first electromagnet is adapted to engage the first portion of the docking structure, and wherein the second electromagnet is adapted to engage the second portion of the docking structure.

20. An apparatus comprising:
a vehicle having a vehicle body;
a retractable harness mounted within the vehicle, the retractable harness comprising a first surface having a first electromagnet and a second surface having a second electromagnet, the first surface separate from the second surface, wherein the first electromagnet and the second electromagnet are configured to engage an aerial drone concurrently;
a first actuator coupled to a first moveable arm of the retractable harness; and
a second actuator coupled to a second moveable arm of the retractable harness, the first actuator and the second actuator configured to move the retractable harness between a retracted position within the vehicle body and an extended position positioned outwardly from the vehicle body.

\* \* \* \* \*